US010705050B2

(12) United States Patent
Su et al.

(10) Patent No.: US 10,705,050 B2
(45) Date of Patent: Jul. 7, 2020

(54) PHOTOIONIZATION DETECTOR ULTRAVIOLET LAMP

(71) Applicant: HONEYWELL INTERNATIONAL INC., Morris Plains, NJ (US)

(72) Inventors: Aimin Su, Morris Plains, NJ (US); Zhongxing Cao, Morris Plains, NJ (US); Bing Chen, Morris Plains, NJ (US); Feng Liang, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/349,068

(22) PCT Filed: Nov. 11, 2016

(86) PCT No.: PCT/CN2016/105430
§ 371 (c)(1),
(2) Date: May 10, 2019

(87) PCT Pub. No.: WO2018/086058
PCT Pub. Date: May 17, 2018

(65) Prior Publication Data
US 2019/0271662 A1 Sep. 5, 2019

(51) Int. Cl.
*G01N 27/70* (2006.01)
*H01J 61/16* (2006.01)
(Continued)

(52) U.S. Cl.
CPC ............. *G01N 27/70* (2013.01); *G01N 27/64* (2013.01); *H01J 61/16* (2013.01); *H01J 61/35* (2013.01)

(58) Field of Classification Search
USPC ...................................................... 250/504 R
See application file for complete search history.

(56) References Cited

U.S. PATENT DOCUMENTS 4,698,314 A * 10/1987 Tao ........................ G01N 21/75 436/171
5,773,883 A 6/1998 Hsi
(Continued)

FOREIGN PATENT DOCUMENTS

CN 1456882 A 11/2003
CN 101006339 A 7/2007
(Continued)

OTHER PUBLICATIONS

International Search Report and Written Opinion for Application No. PCT/CN2016/105430, dated Jun. 28, 2017 7 pages.

*Primary Examiner* — Kiet T Nguyen
(74) *Attorney, Agent, or Firm* — Alston & Bird LLP

(57) ABSTRACT

Embodiments relate generally to an ultraviolet lamp (100) for use with a photoionization detector comprising a sealed tube (102) configured to contain at least one gas; a coating (120) applied to the inner surface (110) of the sealed tube (102); and a crystal window (112) attached to the sealed tube (102), configured to allow transmittance of ultraviolet (UV) light generated within the sealed tube (102). Additional embodiments include a method of forming an ultraviolet lamp (100) for use with a photoionization detector, the method comprising applying at least one layer of a coating (120) onto an inner surface (110) of a sealed tube (102); sealing a crystal window (112) onto the sealed tube (102); filling the sealed tube (102) with at least one gas; sealing the sealed tube (102) containing the at least one gas; generating ultraviolet radiation using the at least one gas within the sealed tube (102); and directing the generated ultraviolet radiation through the crystal window (112) toward a sample gas in the photoionization detector.

20 Claims, 5 Drawing Sheets

500 508 510 504 506 504 504 504 + V - 312 310 502 502 302 300

(51) Int. Cl.

| | |
|---|---|
| ***H01J 61/35*** | (2006.01) |
| ***G01N 27/64*** | (2006.01) |

(56) References Cited

U.S. PATENT DOCUMENTS 6,225,633 B1 5/2001 Sun et al.
2011/0205529 A1* 8/2011 Gross ........................ G01J 3/10
356/51

FOREIGN PATENT DOCUMENTS

CN 101192502 A 6/2008
CN 102052638 A 5/2011

* cited by examiner

PHOTOIONIZATION DETECTOR ULTRAVIOLET LAMP

CROSS-REFERENCE TO RELAYED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Photoionization detectors (PIDs) employ a lamp to emit photons that ionize gases in the proximity of detector electrodes. An electric field is established between the plates of the electrodes by an applied voltage bias. The electric field induces ionized particles to move to one or another plate, thereby establishing an electric current between the electrodes. The electric current can be processed to extract indication of the presence of gas. For example, PIDs may be used to detect the presence and/or concentration of volatile organic compounds (VOCs) which can pose a threat to human beings.

SUMMARY

In an embodiment, an ultraviolet lamp for use with a photoionization detector may comprise a sealed tube configured to contain at least one gas; a coating applied to the inner surface of the sealed tube; and a crystal window attached to the sealed tube, configured to allow transmittance of ultraviolet (UV) light generated within the sealed tube.

In an embodiment, a method of forming an ultraviolet lamp for use with a photoionization detector may comprise applying at least one layer of a coating onto an inner surface of a sealed tube; sealing a crystal window onto the sealed tube; filling the sealed tube with at least one gas; sealing the sealed tube containing the at least one gas; generating ultraviolet radiation using the at least one gas within the sealed tube; and directing the generated ultraviolet radiation through the crystal window toward a sample gas in the photoionization detector.

In an embodiment, a photoionization detector may comprise one or more electrodes; an ultraviolet lamp comprising a sealed tube configured to contain at least one gas; a coating applied to the inner surface of the sealed tube; and a crystal window attached to the sealed tube, configured to allow transmittance of ultraviolet light generated within the sealed tube; and at least one sample gas, wherein ultraviolet radiation is generated within the sealed tube by ionizing the at least one gas, wherein the coating reflects the ultraviolet radiation, and the reflected ultraviolet radiation is directed toward the sample gas, wherein the sample gas is at least partially ionized by the reflected ultraviolet radiation, and wherein the electrodes are configured to detect the electric current produced by the ionization of the sample gas to determine a concentration of the sample gas.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
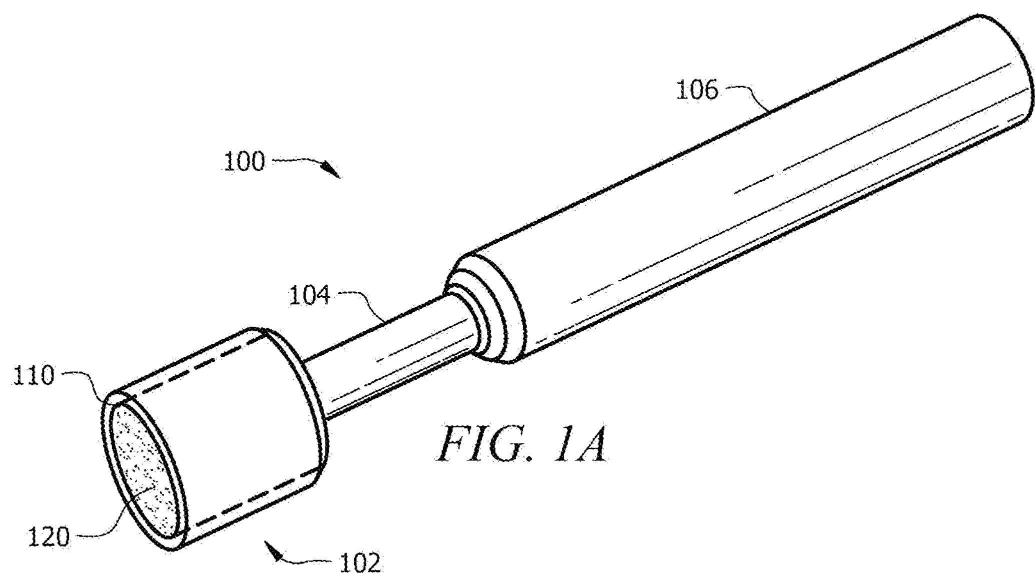
FIG. 1A illustrates a perspective view of an ultraviolet lamp during assembly of the lamp according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term “comprising” means including but not limited to, and should be interpreted in the manner it is typically used in the patent context;

The phrases “in one embodiment,” “according to one embodiment,” and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as “exemplary” or an “example,” it should be understood that refers to a non-exclusive example;

The terms “about” or “approximately” or the like, when used with a number, may mean that specific number, or alternatively, a range in proximity to the specific number, as understood by persons of skill in the art field; and If the specification states a component or feature “may,” “can,” “could,” “should,” “would,” “preferably,” “possibly,” “typically,” “optionally,” “for example,” “often,” or “might” (or other such language) be included or have a characteristic, that particular component or feature is not required to be included or to have the characteristic. Such component or feature may be optionally included in some embodiments, or it may be excluded.

Embodiments of the disclosure include methods and systems for providing increased UV intensity output from an ultraviolet lamp of a PID. PIDs are widely used in environmental monitoring and industry safety fields due to the high sensitivity of the instrument to VOCs. Typically, PIDs employ ultraviolet (UV) lamp(s) to produce high energy photons which ionize the target gas (which may be a VOC). Electrodes may collect the produced ions and process the electrical signal to determine a concentration of the target gas.

A UV lamp may be constructed with a UV transmission crystal window sealed onto a glass tube, where the glass tube may be filled with one or more gases. The gases may be noble gases, such as krypton, helium and/or argon. A high alternating current (AC) voltage may be applied between two electrodes placed outside the UV lamp to induce an ionization process of the gas within the UV lamp, to separate the electrons from the molecules. High energy photons are generated by the recombination of ions and electrons, and these photons pass through the UV window out of the UV lamp into a chamber containing the target gas. Thus, the target gas may be ionized and detected.

The UV lamp is a core element and therefore has a significant effect on the performance of the PID. The performance of the UV lamp may be directly related to the PID in sensitivity, types of gases that can be detected, measurement range, and power consumption, among other things. Particularly, the lifetime of a UV lamp has a significant impact on the PID use and cost.

In the embodiments disclosed herein, a UV lamp may comprise a coating applied to the inner wall of the glass tube. The coating material may have the property of anti-sputtering and second electron emission. The properties of the coating may generate a high intensity UV output from the UV lamp. Due to the effect of the second electron emission, more noble gas molecules may be ionized and therefore more photons may be generated, increasing the UV intensity output from the UV lamp, while allowing for a lower ignition voltage. Additionally, the properties of the coating may allow for more energy to be transferred to the gas molecules, improving ionization efficiency.

The anti-sputtering property of the coating may protect the UV lamp against both high energy ion bombardment and pollution to the working gas. This protection may extend the use-life of the UV lamp.

An embodiment of a UV lamp may comprise a coating on the inner wall of the tube. Coating materials may include any materials that have the property of anti-sputtering, second electron emission, and/or strong reflection for UV light. The coating may be applied to the inner wall using any application method, for example RF sputtering, e-beam evaporation, chemical vapor deposition and wet-chemical method and other similar methods. The embodiment of a UV lamp may comprise a sealed glass tube filled with a gas (such as a noble gas), which is used to produce the UV light needed and is sealed in the tube. An embodiment of a UV lamp may comprise a UV crystal window, which ensures the transmittance of UV light generated within the sealed glass tube and sealed to the tube with a vacuum binder.

Figure 1B:
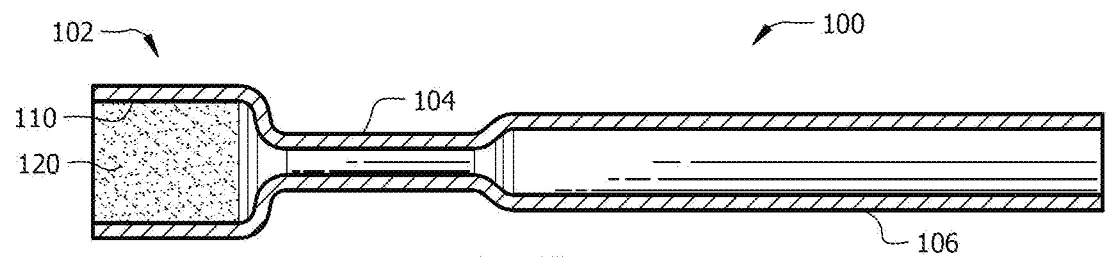
FIG. 1B illustrates a cross-section view of an ultraviolet lamp during assembly of the lamp according to an embodiment.

Referring now to FIGS. 1A-1B, an embodiment of a UV lamp 100 is shown, wherein the UV lamp 100 may comprise an unfinished UV lamp 100. The UV lamp 100 may comprise a sealed tube 102, a separation tube 104, and a vacuum tube 106. In some embodiments, the sealed tube 102 may comprise a cylindrical shape, with a curved inner surface 110. In some embodiments, the sealed tube 102 may comprise a coating 120 located on the inner surface 110 of the sealed tube 102. The coating 120 may be applied to the inner surface 110 of the sealed tube 102 while the UV lamp 100 is in an unfinished state.

The UV lamp 100 may comprise a pre-shaped glass tube that is open at two ends, at the sealed tube 102 and the vacuum tube 106. In some embodiments, the glass tube may be cleaned before the coating 120 is applied to the inner surface 110 of the sealed tube 102. In some embodiments, the sealed tube 102, separation tube 104, and vacuum tube 106 may comprise a single glass tube. In other embodiments, the sealed tube 102, separation tube 104, and vacuum tube 106 may comprise multiple sections of glass tubing.

In some embodiments, the coating 120 may comprise an anti-sputtering material. In some embodiments, the coating 120 may comprise a material that generates a second electron emission. In some embodiments, the coating 120 may comprise a material with strong reflection of ultraviolet light. In some embodiments, the coating 120 may comprise magnesium oxide (MgO), aluminum oxide ($Al_2O_3$), silicon dioxide ($SiO_2$) and/or a combination thereof.

In some embodiments, the coating 120 may be applied to the inner surface 110 of the sealed tube 102 using radio-frequency sputtering. In some embodiments, the coating 120 may be applied to the inner surface 110 of the sealed tube 102 using e-beam evaporation. In some embodiments, the coating 120 may be applied to the inner surface 110 of the sealed tube 102 using chemical vapor deposition. In some embodiments, the coating 120 may be applied to the inner surface 110 of the sealed tube 102 using a wet-chemical application method. In some embodiments, the coating 120 may be applied to the inner surface of the sealed tube using low temperature sintering.

In some embodiments, the coating 120 may comprise one layer of material. In some embodiments, the coating 120 may comprise multiple layers of material, separately applied to the inner surface 110.

Figure 2A:
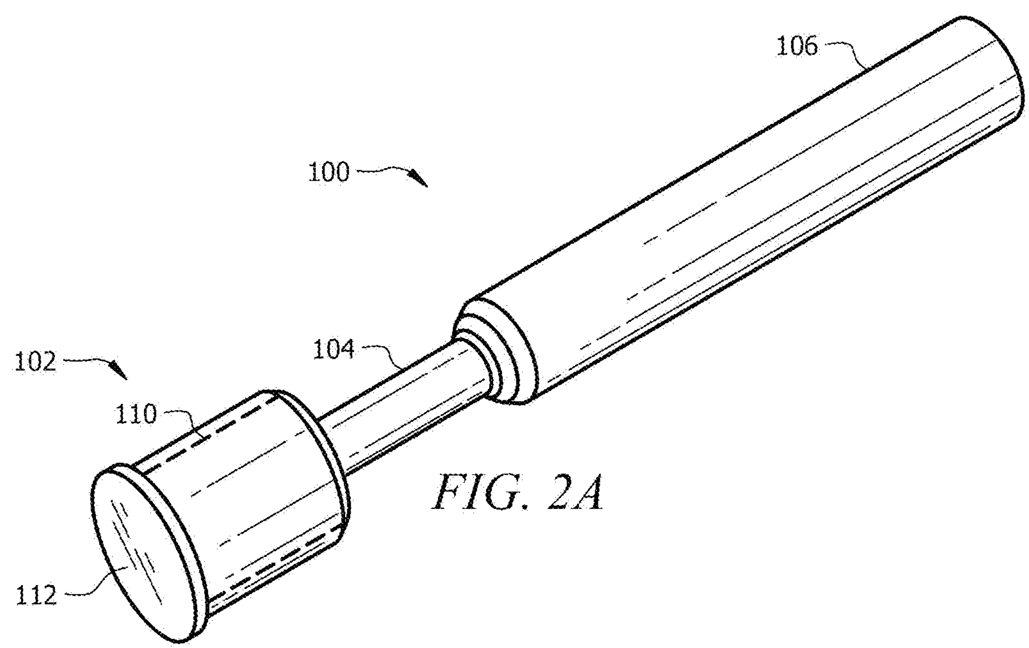
FIG. 2A illustrates a perspective view of an ultraviolet lamp during assembly of the lamp according to an embodiment.
Figure 2B:
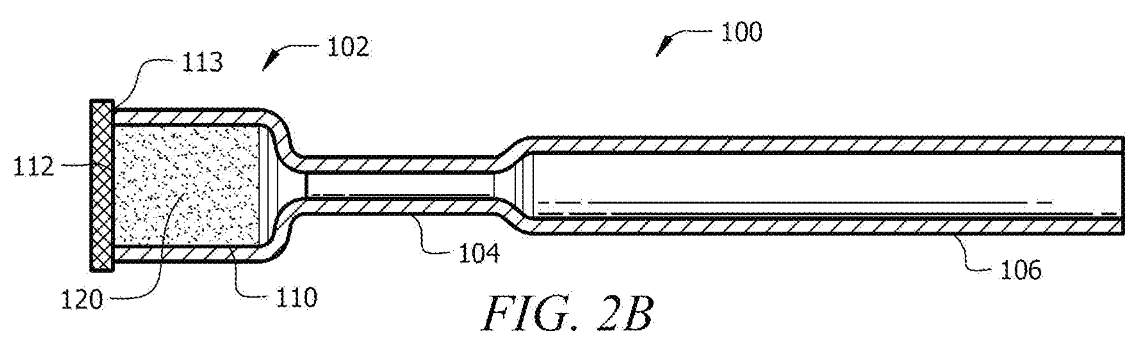
FIG. 2B illustrates a cross-section view of an ultraviolet lamp during assembly of the lamp according to an embodiment.

As shown in FIGS. 2A-2B, the sealed tube 102 may attach to a crystal window 112 on one end. In some embodiments, the crystal window 112 may be bonded at an edge 113 of the sealed tube 102. In some embodiments, the coating layer 120 may be applied to the inner surface 110 of the sealed tube 102, which may comprise the shape of a cylinder. In some embodiments, the coating 120 may be applied to only the curved inner surface 110 of the sealed tube 102. In some embodiments, the crystal window 112 may not be covered with the coating 120. In some embodiments, the crystal window 112 may be attached to the sealed tube 102 after the coating 120 has been applied to the inner surface 110.

After the crystal window 112 is attached to the sealed tube 102, the sealed tube 102 may be filled with one or more gases. The vacuum tube 106 may be configured to attach to a vacuum system, wherein the vacuum system may be used to fill the sealed tube 102 with a low pressure gas. In some embodiments, the gas may flow through the vacuum tube 106 and the separation tube 104 into the sealed tube 102. Then, once the sealed tube 102 is filled with the gas, the separation tube 104 may be sealed at the connection with the sealed tube 102 to seal the gas within the sealed tube 102.

Figure 3A:
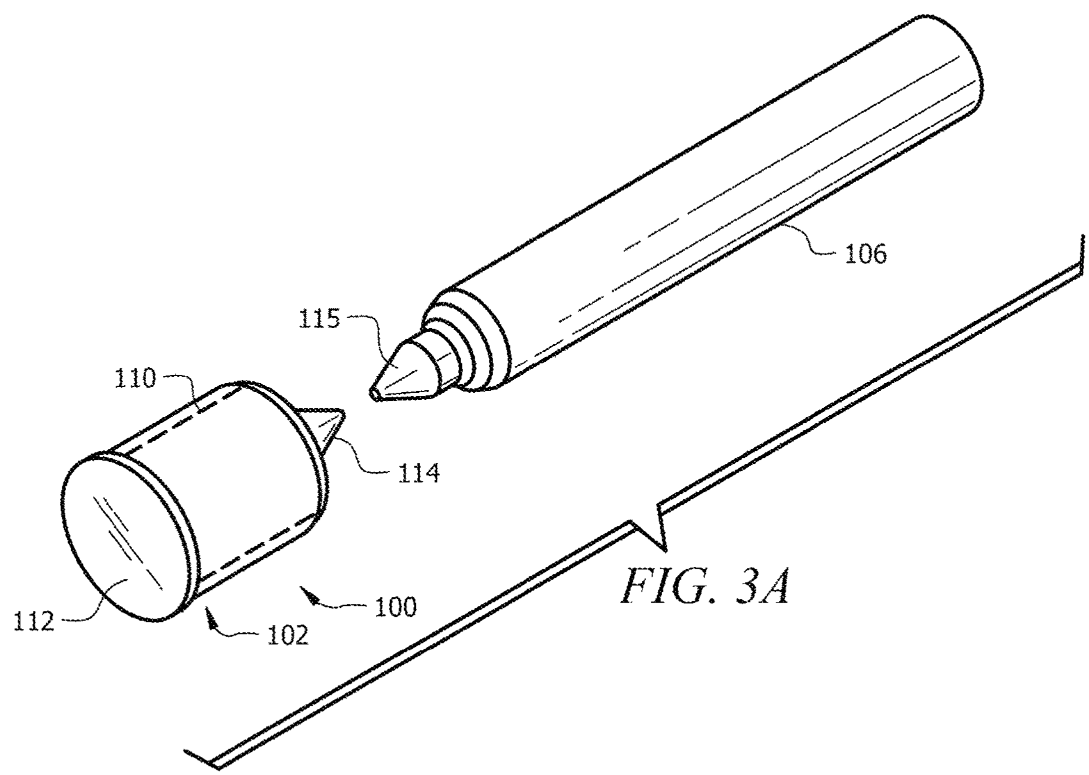
FIG. 3A illustrates a perspective view of an ultraviolet lamp during assembly of the lamp according to an embodiment.
Figure 3B:
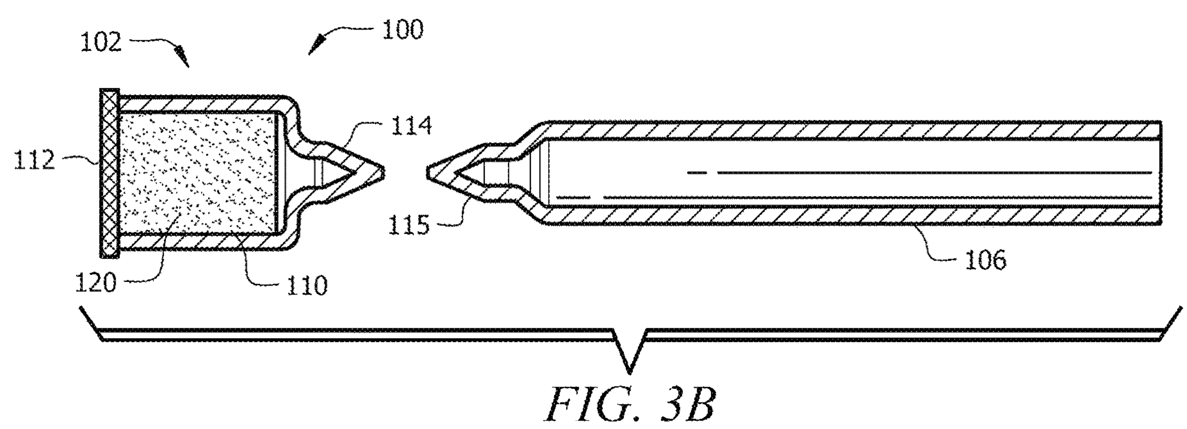
FIG. 3B illustrates a cross-section view of an ultraviolet lamp during assembly of the lamp according to an embodiment.

As shown in FIGS. 3A-3B, the separation tube 104 of the UV lamp 100 may be sealed after the sealed tube 102 has been filled with one or more gas. At least a portion of the separation tube 104 may be melted to seal the contents of the sealed tube 102. In some embodiments, the separation tube 104 may be heated and/or at least partially melted to seal the sealed tube 102.

As shown in FIGS. 3A-3B, the separation tube 104 may be melted and/or shaped to form two shaped sections 114 and 115. The vacuum tube 106 may remain attached to the vacuum system, thereby maintaining the pressure of the gas within the UV lamp 100 until the separation tube 104 has been melted and sealed. The sealed tube 102 with the shaped section 114 may be further used with the coating 120 and crystal window 112 attached.

In some embodiments, a high temperature torch may be used to heat the separation tube 104, melting the glass material, and then the shaped sections 114 and 115 may be formed of the melted glass material. The shaped section 114 may seal the sealed tube 102. The shaped section 115 may seal the vacuum tube 106. The shaped sections 114 and 115 may separate the sealed tube 102 from the vacuum tube 106.

Once the UV lamp 100 has been formed (by separating the sealed tube 102), it may be used in a PID. The coating 120 may increase the UV intensity output from the UV lamp 100 based on the reflections from the gas and/or coating 120. An exemplary UV lamp 100 was tested to determine the produced UV intensity, and compared with a conventional UV lamp that does not comprise a coating on the inner layer. Table 1 shows the performance of the conventional UV lamp, and Table 2 shows the performance of the UV lamp 100 with the coating 120. As can be seen in the tables, the UV lamp 100 with the coating requires a lower ignition voltage, but still produces a higher UV intensity output than the conventional UV lamp. In these tests, UV intensity was measured by the electric signal of 100 ppm isobutylene in units of counts.

TABLE 1

UV Intensity from Typical UV Lamp

| Conventional UV Lamp | Ignition Voltage (V) | UV intensity |
|---|---|---|
| #1 | 1486 | 5639 |
| #2 | 1408 | 9856 |
| #3 | 1492 | 5321 |
| #4 | 1492 | 4901 |
| #5 | 1420 | 4843 |

TABLE 2

UV Intensity from UV Lamp with Coating

| UV Lamp with Coating | Ignition Voltage (V) | UV intensity |
|---|---|---|
| #1 | 1142 | 29,880 |
| #2 | 1092 | 27,371 |
| #3 | 1094 | 27,358 |
| #4 | 1150 | 26,211 |
| #5 | 1092 | 25,288 |

Figure 4A:
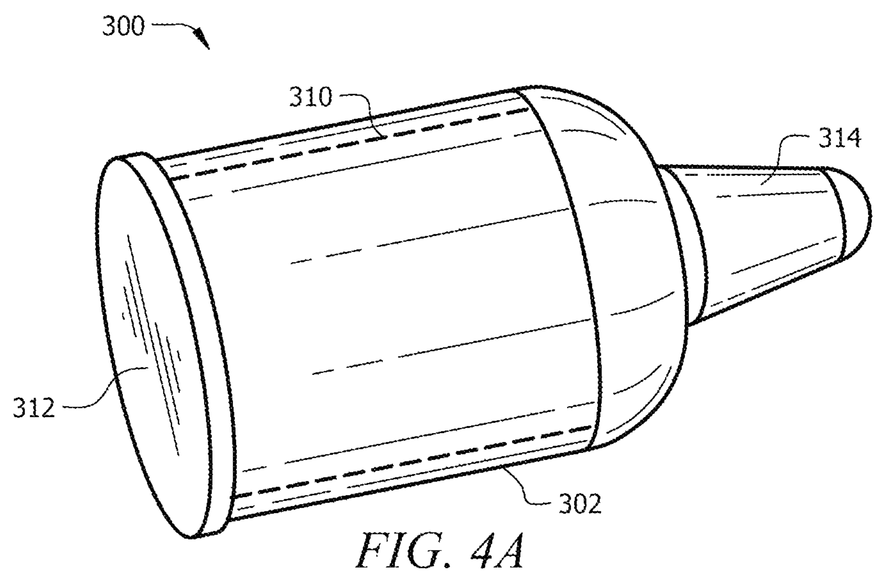
FIG. 4A illustrates perspective view of an ultraviolet lamp for use with a photoionization detector according to an embodiment.
Figure 4B:
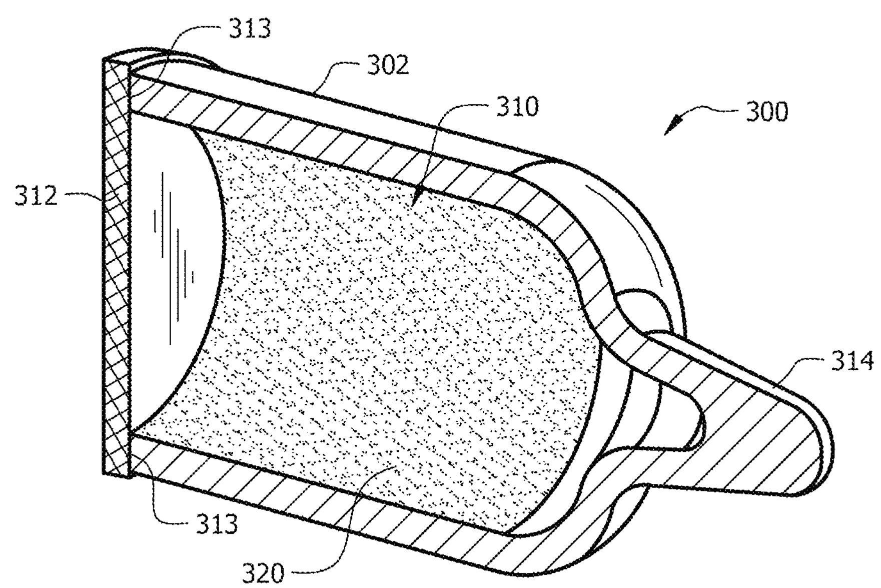
FIG. 4B illustrates cross-section view of an ultraviolet lamp for use with a photoionization detector according to an embodiment.

Referring now to FIGS. 4A-4B, an embodiment of a UV lamp 300 is shown, wherein the UV lamp 300 may comprise a finished UV lamp 300. In some embodiments, the UV lamp 300 may be similar to the UV lamp 100 described above. The UV lamp 300 may comprise a sealed tube 302 with a coating 320 located on a curved inner surface 310, and a crystal window 312 attached to the edge 313 of the sealed tube 302. The UV lamp 300 may also comprise a shaped section 314 configured to seal the sealed tube 302 (similar to the shaped section 114 above).

In some embodiments, the shaped section 314 may be configured to attach to another element of a PID. In some embodiments, the shaped section 314 may be formed by melting/shaping a sealing tube, as described above.

Figure 5:
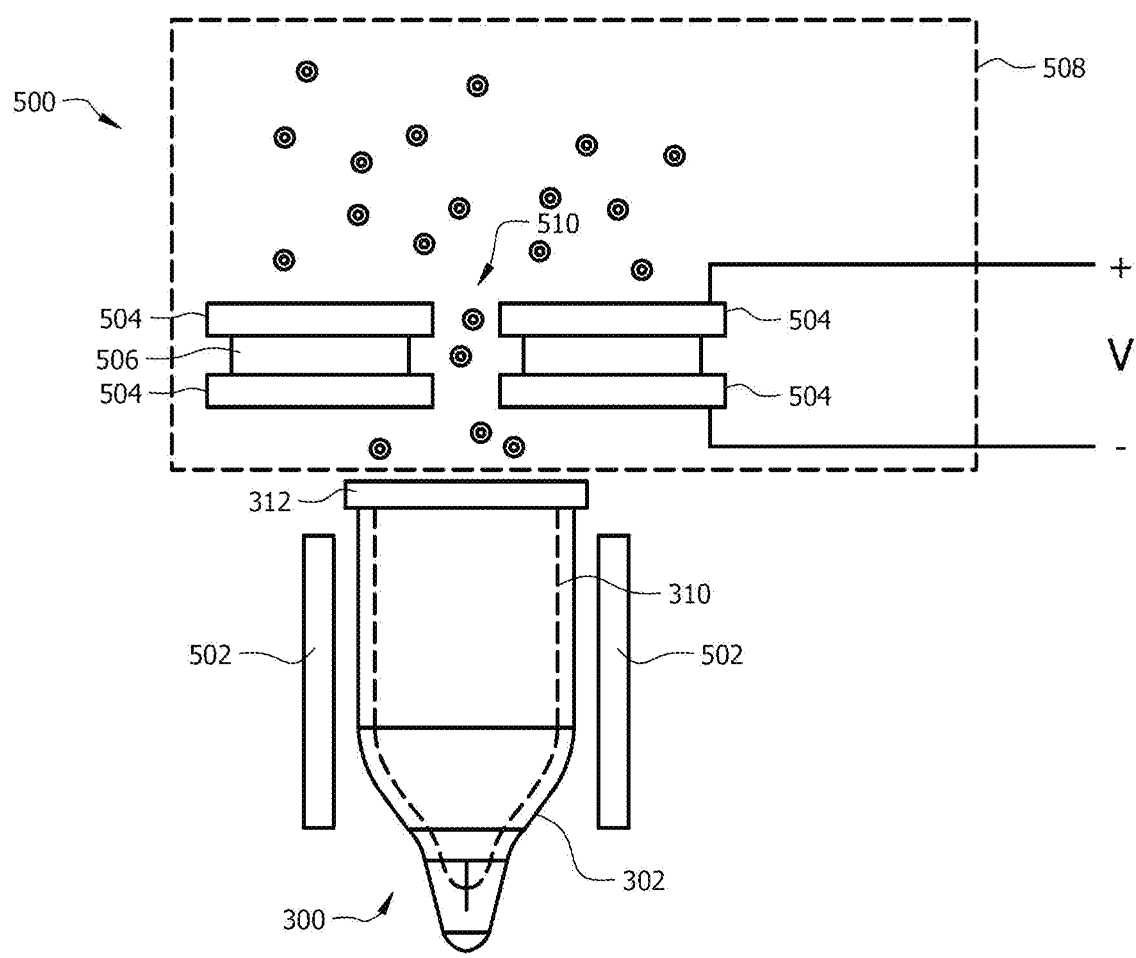
FIG. 5 illustrates a schematic drawing of a photoionization detector according to an embodiment.

Referring now to FIG. 5, a finished UV lamp 300 may be used in a PID system 500, wherein the gas(es) located within the sealed tube 302 may be used to generate a light source for the PID. In some embodiments, the UV lamp 300 may be located proximate to one or more excitation electrodes 502.

The UV lamp 300 functions as a UV light source for the PID system 500. The UV lamp 300 may comprise one or more noble gas sealed inside the sealed tube 302. UV light can be generated inside the UV lamp 300 by applying high voltage AC power via two excitation electrodes 502 located outside the UV lamp 300. The UV light generated inside the lamp 300 may pass through the crystal window 312 to the outside of the lamp 300. In some embodiments, the glass material of the UV lamp 300 may strongly absorb the UV light. The PID system 500 may be located proximate to the crystal window 312, and may comprise an ionization chamber 508. The ionization chamber 508 may comprise detector electrodes 504 inside the ionization chamber 508, configured to detect the ionization of the gas molecules 510 within the ionization chamber 508. In some embodiments, the detector electrodes 504 may comprise an insulation material 506. The gas molecules 510 from the environment may enter the ionization chamber 508, the gas molecules 510 may absorb the energy of the UV light from the UV lamp 300, and then the gas molecules 510 may be ionized. The ionized particles can produce a current by their movements within the ionization chamber 508, which may be detected by the detector electrodes 504. The coating 320 (shown above) within the UV lamp 300 may increase the intensity of the UV light that is directed out of the UV lamp 300 toward the sample gas molecules 510.

In a first embodiment, an ultraviolet lamp for use with a photoionization detector may comprise a sealed tube configured to contain at least one gas; a coating applied to the inner surface of the sealed tube; and a crystal window attached to the sealed tube, configured to allow transmittance of UV light generated within the sealed tube.

A second embodiment can include the ultraviolet lamp of the first embodiment, wherein the coating comprises an anti-sputtering material.

A third embodiment can include the ultraviolet lamp of the first or second embodiments, wherein the coating comprises a material that generates a second electron emission.

A fourth embodiment can include the ultraviolet lamp of any of the first to third embodiments, wherein the coating comprises a material with strong reflection of UV light.

A fifth embodiment can include the ultraviolet lamp of any of the first to fourth embodiments, wherein the coating comprises magnesium oxide (MgO).

A sixth embodiment can include the ultraviolet lamp of any of the first to fifth embodiments, wherein the coating is applied to the inner surface of the sealed tube using radio-frequency sputtering.

A seventh embodiment can include the ultraviolet lamp of any of the first to sixth embodiments, wherein the coating is applied to the inner surface of the sealed tube using e-beam evaporation.

An eighth embodiment can include the ultraviolet lamp of any of the first to seventh embodiments, wherein the coating is applied to the inner surface of the sealed tube using chemical vapor deposition.

A ninth embodiment can include the ultraviolet lamp of any of the first to eighth embodiments, wherein the coating is applied to the inner surface of the sealed tube using a wet-chemical application method.

A tenth embodiment can include the ultraviolet lamp of any of the first to ninth embodiments, further comprising at least one gas sealed within the sealed tube, wherein the gas is configured to generate ultraviolet light when ionized, and wherein the ultraviolet light is directed out of the sealed tube via the crystal window.

An eleventh embodiment can include the ultraviolet lamp of the tenth embodiment, wherein the at least one gas comprises at least one noble gas.

In a twelfth embodiment, a method of forming an ultraviolet lamp for use with a photoionization detector may comprise applying at least one layer of a coating onto an inner surface of a sealed tube; sealing a crystal window onto the sealed tube; generating ultraviolet radiation using the at least one gas within the sealed tube; and directing the generated ultraviolet radiation through the crystal window toward a sample gas in the photoionization detector.

A thirteenth embodiment can include the method of the twelfth embodiment, further comprising reflecting the generated ultraviolet radiation by the coating, and directing the reflected ultraviolet radiation toward the sample gas in the photoionization detector.

A fourteenth embodiment can include the method of the thirteenth embodiment, further comprising ionizing the sample gas using the generated and reflected ultraviolet radiation; detecting the electric current produced by the ionization; and determining the concentration of the sample gas based on the detected electric current.

A fifteenth embodiment can include the method of the fourteenth embodiment, wherein the intensity of the generated ultraviolet radiation is increased by the coating, thereby increasing the ionization of the sample gas.

A sixteenth embodiment can include the method of any of the twelfth to fifteenth embodiments, wherein the crystal window is free of the coating.

A seventeenth embodiment can include the method of any of the twelfth to sixteenth embodiments, wherein the coating comprises one or more of an anti-sputtering material, and a material that generates a second electron emission.

In an eighteenth embodiment, a photoionization detector may comprise one or more electrodes; an ultraviolet lamp comprising a sealed tube configured to contain at least one gas; a coating applied to the inner surface of the sealed tube; and a crystal window attached to the sealed tube, configured to allow transmittance of ultraviolet light generated within the sealed tube; and at least one sample gas, wherein ultraviolet radiation is generated within the sealed tube by ionizing the at least one gas, wherein the coating reflects the ultraviolet radiation, and the reflected ultraviolet radiation is directed toward the sample gas, wherein the sample gas is at least partially ionized by the reflected ultraviolet radiation, and wherein the electrodes are configured to detect the electric current produced by the ionization of the sample gas to determine a concentration of the sample gas.

A nineteenth embodiment can include the photoionization detector of the eighteenth embodiment, wherein the coating comprises one of an anti-sputtering material, a material that generates a second electron emission, and a material with strong reflection of ultraviolet light.

A twentieth embodiment can include the photoionization detector of the eighteenth or nineteenth embodiments, wherein the coating is applied to the inner surface of the sealed tube using one or more of radio-frequency sputtering, e-beam evaporation, chemical vapor deposition, and a wet-chemical application method.

A twenty-first embodiment can include the photoionization detector of any of the eighteenth to twentieth embodiments, further comprising at least one gas sealed within the sealed tube, wherein the gas is configured to generate ultraviolet light when ionized, and wherein the ultraviolet light is directed out of the sealed tube via the crystal window.

A twenty-second embodiment can include the photoionization detector of the twenty-first embodiment, wherein the at least one gas comprises at least one noble gas.

A twenty-third embodiment can include the photoionization detector of any of the eighteenth to twenty-second embodiments, wherein the coating comprises magnesium oxide ($MgO$).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a “Field,” the claims should not be limited by the language chosen under this heading to describe the so-called field. Further, a description of a technology in the “Background” is not to be construed as an admission that certain technology is prior art to any invention(s) in this disclosure. Neither is the “Summary” to be considered as a limiting characterization of the invention(s) set forth in issued claims. Furthermore, any reference in this disclosure to “invention” in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as “comprises,” “includes,” and “having” should be understood to provide support for narrower terms such as “consisting of,” “consisting essentially of,” and “comprised substantially of” Use of the terms “optionally,” “may,” “might,” “possibly,” and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An ultraviolet lamp for use with a photoionization detector, the ultraviolet lamp comprising:
- a sealed tube configured to contain at least one gas;
- a coating applied to the inner surface of the sealed tube, wherein the coating comprises at least one of an anti-sputtering material, a material that generates a second electron emission, and a material with strong reflection of UV light; and
- a crystal window attached to the sealed tube, configured to allow transmittance of ultraviolet light generated within the sealed tube.

2. The ultraviolet lamp of claim 1, wherein the coating comprises aluminum oxide ($Al_2O_3$).

3. The ultraviolet lamp of claim 1, wherein the coating comprises silicon dioxide ($SiO_2$).

4. The ultraviolet lamp of claim 1, wherein the coating comprises magnesium oxide (MgO).

5. The ultraviolet lamp of claim 1, wherein the coating is applied to the inner surface of the sealed tube using radio-frequency sputtering.

6. The ultraviolet lamp of claim 1, wherein the coating is applied to the inner surface of the sealed tube using e-beam evaporation.

7. The ultraviolet lamp of claim 1, wherein the coating is applied to the inner surface of the sealed tube using chemical vapor deposition.

8. The ultraviolet lamp of claim 1, wherein the coating is applied to the inner surface of the sealed tube using a wet-chemical application method.

9. The ultraviolet lamp of claim 1, wherein the coating is applied to the inner surface of the sealed tube using low temperature sintering.

10. The ultraviolet lamp of claim 1, further comprising at least one gas sealed within the sealed tube, wherein the gas is configured to generate ultraviolet light when ionized, and wherein the ultraviolet light is directed out of the sealed tube via the crystal window.

11. The ultraviolet lamp of claim 10, wherein the at least one gas comprises at least one noble gas.

12. A method of forming an ultraviolet lamp for use with a photoionization detector, the method comprising:
- applying at least one layer of a coating onto an inner surface of a sealed tube, wherein the coating comprises at least one of an anti-sputtering material, a material that generates a second electron emission, and a material with strong reflection of UV light;
- sealing a crystal window onto the sealed tube;
- filling the sealed tube with at least one gas;
- sealing the sealed tube containing the at least one gas;
- generating ultraviolet radiation using the at least one gas within the sealed tube; and
- directing the generated ultraviolet radiation through the crystal window toward a sample gas in the photoionization detector.

13. The method of claim 12, further comprising reflecting the generated ultraviolet radiation by the coating; and directing the reflected ultraviolet radiation toward the sample gas in the photoionization detector.

14. The method of claim 13, further comprising:
- ionizing the sample gas using the generated and reflected ultraviolet radiation;
- detecting the electric current produced by the ionization; and
- determining the concentration of the sample gas based on the detected electric current.

15. The method of claim 14, wherein the intensity of the generated ultraviolet radiation is increased by the coating, thereby increasing the ionization of the sample gas.

16. The method of claim 12, wherein the crystal window is free of the coating.

17. The method of claim 12, wherein the coating comprises one or more of an anti-sputtering material, and a material that generates a second electron emission.

18. A photoionization detector comprising:
- one or more electrodes;
- an ultraviolet lamp comprising:
  - a sealed tube configured to contain at least one gas;
  - a coating applied to the inner surface of the sealed tube; and
  - a crystal window attached to the sealed tube, configured to allow transmittance of ultraviolet light into the sealed tube; and
- at least one sample gas, wherein:
- ultraviolet radiation is generated within the sealed tube by ionizing the at least one gas,
- the coating reflects the ultraviolet radiation, and the reflected ultraviolet radiation is directed toward the sample gas,
- the sample gas is at least partially ionized by the reflected ultraviolet radiation, and
- the electrodes are configured to detect the electric current produced by the ionization of the sample gas to determine a concentration of the sample gas.

19. The photoionization detector of claim 18, wherein the coating comprises one of an anti-sputtering material, a material that generates a second electron emission, and a material with strong reflection of ultraviolet light.

20. The photoionization detector of claim 18, wherein the coating is applied to the inner surface of the sealed tube using one or more of radio-frequency sputtering, e-beam evaporation, chemical vapor deposition, and a wet-chemical application method.

* * * * *